(12) United States Patent
Takehara et al.

(10) Patent No.: US 7,613,108 B2
(45) Date of Patent: Nov. 3, 2009

(54) REDUNDANT SUPERVISORY CONTROL SYSTEM, AND REDUNDANCY SWITCHING METHOD OF THE SAME

(75) Inventors: Jun Takehara, Tokyo (JP); Akira Sawada, Tokyo (JP); Makoto Toko, Saitama (JP); Hiroyuki Kusakabe, Tokyo (JP); Shinya Kono, Tokyo (JP); Yuuji Umeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 11/566,310

(22) Filed: Dec. 4, 2006

(65) Prior Publication Data
US 2007/0147232 A1  Jun. 28, 2007

(30) Foreign Application Priority Data
Dec. 27, 2005  (JP)  ............................. 2005-376256

(51) Int. Cl.
*G06F 11/16* (2006.01)

(52) U.S. Cl. ...................... 370/222; 370/216; 370/221; 370/223; 370/224; 398/9; 398/10; 398/16; 398/17

(58) Field of Classification Search ................ 370/216, 370/221, 222, 223, 224; 709/223–226
See application file for complete search history.

(56) References Cited

U.S. PATENT DOCUMENTS

| 4,527,270 A | 7/1985 | Sweeton | |
| 5,054,111 A * | 10/1991 | Goodwin | 455/509 |
| 6,226,681 B1 * | 5/2001 | Koga et al. | 709/236 |
| 6,639,893 B1 * | 10/2003 | Chikenji et al. | 370/217 |
| 2006/0280117 A1 * | 12/2006 | Gopinadhan et al. | 370/216 |

FOREIGN PATENT DOCUMENTS

JP  57-157301  9/1982

OTHER PUBLICATIONS

U.S. Appl. No. 12/108,774, filed Apr. 24, 2008, Sameda, et al.

* cited by examiner

*Primary Examiner*—William Trost, IV
*Assistant Examiner*—Charles C Jiang
(74) *Attorney, Agent, or Firm*—Oblon, Spivak, McClelland, Maier & Neustadt, L.L.P.

(57) ABSTRACT

An object is to provide a redundant supervisory control system and a redundancy switching method thereof. In the redundant supervisory control system, remote I/O apparatuses are less likely to be inaccessible, even in a case where failures occur in plural locations. Thus, the reliability of the system is enhanced. The redundant supervisory control system including a plurality of first loop interface units in each of a pair of controllers, second loop interface units, and communication cables each connecting the plurality of first and second loop interface units with one another in a circular loop. The redundant supervisory control system is configured by connecting the controllers and the remote I/O units to one another in a plurality of loop networks. In a case where abnormality in the loop networks is detected by use of received data in the networks, the first and second loop interface units that can perform normal reception are automatically selected.

7 Claims, 14 Drawing Sheets

FIG. 10

| NODE OF TRANSMISSION SOURCE | CURRENTLY SELECTED LOOP I/F UNITS | CURRENTLY UNSELECTED LOOP I/F UNITS | SELECTION JUDGMENT ON LOOP I/F UNITS AT OCCURRENCE OF ABNORMALITY |
|---|---|---|---|
| CONTROLLER | NORMAL | NORMAL | MAINTAIN CURRENTLY SELECTED LOOP I/F UNITS |
| | NORMAL | ABNORMAL | MAINTAIN CURRENTLY SELECTED LOOP I/F UNITS |
| | ABNORMAL | ABNORMAL | MAINTAIN CURRENTLY SELECTED LOOP I/F UNITS |
| | ABNORMAL | NORMAL | SELECT LOOP I/F UNITS OF OTHER SYSTEM |
| REMOTE I/O UNIT 2-1 | NORMAL | NORMAL | MAINTAIN CURRENTLY SELECTED LOOP I/F UNITS |
| | NORMAL | ABNORMAL | MAINTAIN CURRENTLY SELECTED LOOP I/F UNITS |
| | ABNORMAL | ABNORMAL | MAINTAIN CURRENTLY SELECTED LOOP I/F UNITS |
| | ABNORMAL | NORMAL | SELECT LOOP I/F UNITS OF OTHER SYSTEM |
| REMOTE I/O UNIT 2-2 | NORMAL | NORMAL | MAINTAIN CURRENTLY SELECTED LOOP I/F UNITS |
| | NORMAL | ABNORMAL | MAINTAIN CURRENTLY SELECTED LOOP I/F UNITS |
| | ABNORMAL | ABNORMAL | MAINTAIN CURRENTLY SELECTED LOOP I/F UNITS |
| | ABNORMAL | NORMAL | SELECT LOOP I/F UNITS OF OTHER SYSTEM |
| ⋮ | ⋮ | ⋮ | ⋮ |
| REMOTE I/O UNIT 2-n | NORMAL | NORMAL | MAINTAIN CURRENTLY SELECTED LOOP I/F UNITS |
| | NORMAL | ABNORMAL | MAINTAIN CURRENTLY SELECTED LOOP I/F UNITS |
| | ABNORMAL | ABNORMAL | MAINTAIN CURRENTLY SELECTED LOOP I/F UNITS |
| | ABNORMAL | NORMAL | SELECT LOOP I/F UNITS OF OTHER SYSTEM |

FIG. 13

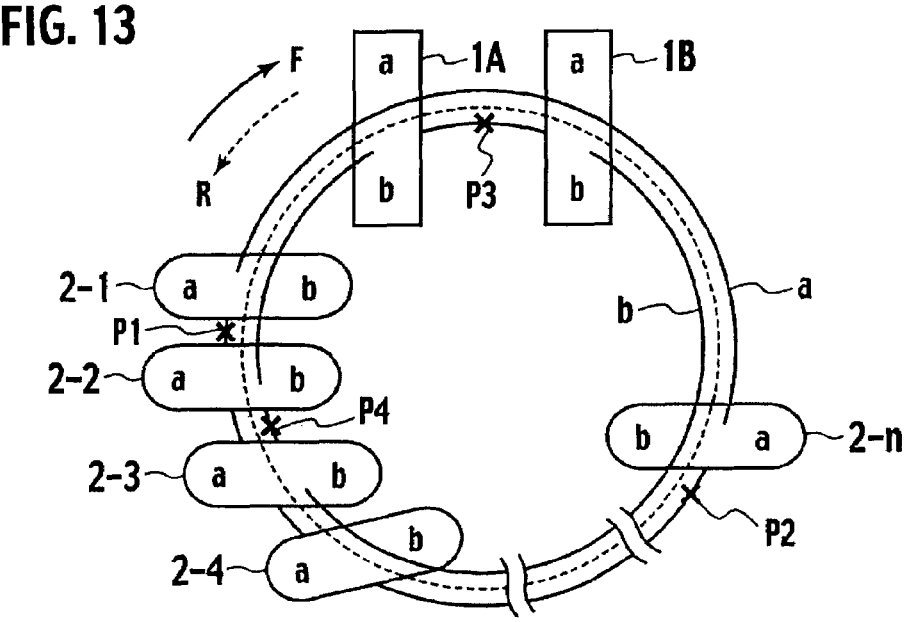

FIG. 14A

ACTIVE SYSTEM CONTROLLER 1A

| TRANSMISSION SOURCE NODE | LOOP NETWORK a | | LOOP NETWORK b | | (a+b) |
|---|---|---|---|---|---|
| COMMUNICATION DIRECTION | F | R | F | R | |
| CONTROLLER 1B | ○ | × | × | × | ○ |
| REMOTE I/O UNIT 1 | × | ○ | × | ○ | ○ |
| REMOTE I/O UNIT 2 | × | × | × | ○ | ○ |
| REMOTE I/O UNIT 3 | × | × | × | × | × |
| REMOTE I/O UNIT 4 | × | × | × | × | × |
| REMOTE I/O UNIT n | ○ | × | × | × | ○ |

FIG. 14B

STANDBY SYSTEM CONTROLLER 1B

| TRANSMISSION SOURCE NODE | LOOP NETWORK a | | LOOP NETWORK b | | (a+b) |
|---|---|---|---|---|---|
| COMMUNICATION DIRECTION | F | R | F | R | |
| CONTROLLER 1A | × | ○ | × | × | ○ |
| REMOTE I/O UNIT 1 | × | ○ | × | × | ○ |
| REMOTE I/O UNIT 2 | × | × | × | × | × |
| REMOTE I/O UNIT 3 | × | × | ○ | × | ○ |
| REMOTE I/O UNIT 4 | × | × | ○ | × | ○ |
| REMOTE I/O UNIT n | ○ | × | ○ | × | ○ |

FIG. 16

PRIORITY JUDGMENT TABLE

| REMOTE I/O UNIT NO. | PRIORITY |
|---|---|
| 2-1 | LOW PRIORITY |
| 2-2 | HIGH PRIORITY |
| 2-3 | LOW PRIORITY |
| 2-4 | LOW PRIORITY |
| ⋮ | |
| 2-n | LOW PRIORITY |

REDUNDANT SUPERVISORY CONTROL SYSTEM, AND REDUNDANCY SWITCHING METHOD OF THE SAME

CROSS-REFERENCE TO RELATED APPLICATION

This application is based upon and claims the benefit of priority from the prior Japanese Patent Application No. 2005-376256, filed on Dec. 27, 2005. The entire contents of which are incorporated herein by reference.

BACKGROUND OF THE INVENTION

1. Field of the Invention

The present invention relates to a redundant supervisory control system and a switching control method of the same. When data is transmitted between each of a plurality of controllers and each of a plurality of remote input/output devices those which are composing the system, the redundant supervisory control system switches transmission paths between them.

2. Description of the Related Art

A block diagram of a conventional supervisory control system which controls a plant or the like is shown in FIG. 1. In this configuration, a controller 11 and each of remote input/output (I/O) units 21 are cascade-connected to each other by utilizing a field bus 113 of a digital network that is defined, for example, according to IEC61158, and that is used in communications between measurement-and-control instruments. In this way, supervisory control of the plant is executed.

This connection scheme of the network entails the following problem. In the event of a break of the field bus 113 or a breakdown of one of the remote I/O units 21, the controller 11 and the remote I/O unit 21 are disconnected. As a result, all of the I/O units 21 in the downstream of the location of the breakdown become inaccessible.

Additionally, there is another connection scheme, as shown in FIG. 2, where a controller 12 and remote I/O units 22 are connected in a one-to-many relationship in a star shape. In the case of this scheme, however, in addition to the problem of disconnection due to a breakdown, there is a problem of poor extensibility. This is because the number of interface buses 114 of the controller 12 has to be as many as the number of the remote I/O units 22.

For the purpose of solving these problems, there is a supervisory control system as shown in FIG. 3 which is constituted by connecting a field bus 115 and loop interface (I/F) units 23a to one another in a ring. In this connection scheme, in the event of only one break of the filed buses 115 in the ring, the controller 13 can access all of the remote I/O units 23. Moreover, in the event of a breakdown in only one of the remote I/O units 23, the controller 13 can access all the rest of the remote I/O units 23. Thus, the supervisory control can be continued.

Also in this connection scheme, however, when failures occur in plural locations, the failures including a cable break in the field bus 115 and a breakdown in the remote I/O units 23, the controller 13 cannot access the remote I/O units 23 positioned at a side far from the location of each of the failures.

In addition, as a redundancy scheme for taking a countermeasure against an equipment breakdown, there has conventionally been a dual supervisory control system as shown in FIG. 4.

In this scheme, a control system, which is constituted of a controller 14A, a controller 14B and remote I/O units 24, or the like is made dual-redundant. One of the dual-redundant systems is used as an active system, and the other of the dual-redundant systems is used as a standby system. In a case where a breakdown occurs in the remote I/O units 24 of the active system, the remote I/O units 24 are accessible by switching from the active system to the standby system, and thus the system can continue a control.

However, in this dual supervisory control system, there is a problem of a temporary interruption of the control. This is because it is inevitable to switch from the active system to the standby system, even when a breakdown occurs in only one location in the remote I/O units 24.

Additionally, there is a case where failures occur in both of the systems including the plural remote I/O units 24. To be more precise, this is the case where one of failures occurs in an interface (I/F) unit 24a that belongs to one of the systems in a remote I/O unit 24 and the other failure occurs in an I/F unit 24b that belongs to the other of the systems in another remote I/O unit 24. This case causes another problem that the remote I/O unit 24 of any one of the systems become inaccessible.

On the other hand, in a supervisory control system 100 as shown in FIG. 5, in a case where dual transmission paths 117 and 118 of a process input/output apparatus (PIO) 61 are switched to each other, switching from an active system to a standby system is made system by system regardless a location of a failure. That is, the entire system is switched even when the failure does not occur in a common portion of one of the data transmission paths each connecting a plurality of controllers 41.

For example, there is a case where there is a break in any one of transmission path portions a and b, each of which is located before a main line (common portion) of the corresponding transmission path from each of the two controllers 41 of the PIO 61, and each of which concerns only each of these controllers 41. Even in this case, the supervisory control system cannot grasp this situation. Thus, the supervisory control system switches the active data transmission path to the standby one, by judging that any one of the entire transmission paths 117 and 118 of the active system is abnormal.

In this case, even though the other controllers 41 do not have any failure of the transmission path 117 of the active system, the active transmission path 117 is switched to the standby one. Additionally, in a conventional method of switching transmission paths, only any one of the systems is used as an active system. For this reason, in a case where breaks simultaneously occur in a transmission path portion of the active system of one of the controllers 41, the portion being out of the common portion, and a transmission path portion of the standby system of another one of the controllers 41, it becomes impossible to communicate with the controller of at least one of the systems.

Accordingly, input data from at least one of the controllers 41 are missed, and, at the same time, the supervisory control system 100 comes to treat this controller as having a breakdown.

In order to solve the problem as described above, there is a method of switching data transmission paths used by a remote PIO unit (for example, refer to Japanese Patent Application Publication No. Hei 11(1999)-119802). In this method, the transmission paths used by the PIOs 61 are efficiently switched to each other, when a failure occurs in a portion that is located from each of the controllers 41 to each of the dual transmission paths 117 and 118, and that concerns only individual one of the controllers 41. Thus, this method makes it possible to construct a highly reliable system.

In this method, the transmission path of the active system is switched to that of the standby system by using units of control means for controlling inputs and outputs unit by unit.

Thus, the method has been disclosed, in which transmission paths used by the PIO 61 are efficiently switched with the means mentioned above, and which makes it possible to construct a highly reliable system.

Additionally, a method has been disclosed for enhancing reliability of a process control system in the following way. A control itself of a remote PIO is multiplexed, and thus, the remote PIO has serial buses capable of performing a multitask operation (for example, Japanese Patent Application Publication No. 2000-207373).

However, in the dual supervisory control system as shown in FIG. 4, there is a problem that a breakdown occurring in any one location in the remote I/O units 24 inevitably brings about switching from the active system to the standby system, thereby causing a temporary interruption of the control.

Additionally, there is another problem that, in a case where failures occur, if one of the failures occurs in the I/F unit 24*a* of one of the plural remote I/O units 24, and the other failure occurs in the an I/F unit 24*b* of another one of the remote I/O units 24, the remote I/O units 24 of any one of the systems becomes inaccessible.

In addition, the method of switching transmission paths by use of the PIO disclosed in Japanese Patent Application Publication No. Hei 11(1999)-119802 has the following problems. In a case where a failure occurs in any portion of the transmission path that is the main line, signals from I/O units disconnected from the main line of the transmission path are not duplexed. In addition, in a case where both of the dual main lines of the transmission paths have failures, it becomes impossible to control the I/O apparatus.

Furthermore, in the method disclosed in Japanese Patent Application Publication No. 2000-207373, although reliability of the PIO is enhanced, no consideration is given to a problem of a failure in the main line of the transmission path connecting the controller and the PIOS.

SUMMARY OF THE INVENTION

It is an object of this present invention to provide a redundant supervisory control system capable of enhancing reliability of the system, and a redundancy switching method thereof. In the redundant supervisory control system, the remote input/output units are less likely to be inaccessible, even when failures occur in plural locations in transmission paths from remote input/output units to a controller.

The object of the invention described above is achieved by a redundant supervisory control system which includes: a plurality of first loop interface units in each of the pair of controllers; a plurality of second loop interface units in each of the plurality of remote input/output units: and communication cables each connecting the plurality of first loop interface units and the plurality of second loop interface units in a circular loop. The redundant supervisory control system is configured by connecting the controllers and the remote input/output units to one another in plural loop networks The redundant supervisory control system automatically selects the first loop interface unit and the second loop interface unit that are able to perform normal reception, in a case where abnormality is detected in received data from the loop networks. Accordingly, the redundant supervisory control system is capable of continuing control without switching the control right of the currently active controller, in a case where portions respectively of the plurality of loop networks do not overlap with one another, each of the portions starting from each of the pair of controllers, and ending at a location of a failure.

Additionally, in order to achieve the above object, the redundant supervisory control system of the present invention functions as follows. The redundant supervisory control system collects reception information on whether or not communications between each of the controllers and each of the plurality of remote input/output units are performed normally. Then, the connection statuses of the respective loop networks are judged by use of the collected reception information. The control right of each of the pair of controllers is set based on both these connection statuses of the loop networks and a priority judgment table beforehand set for each of the remote input/output units. Accordingly, switching of the control right is judged based on information from the preset priority judgment table in a case where: portions respectively in the plurality of loop networks do not overlap with one another, each of the portions starting from each of the pair of controllers to a location of a failure; or the loop networks are different from one another in a range where each of the pair of controller can access the remote input/output units as a result of segmentation of the loop networks respectively of the pair of controllers. Consequently, it becomes possible to provide the redundant supervisory control system capable of performing a continuous operation by avoiding switching of the control rights to the extent as possible when failures occur in plural locations.

Moreover, the redundancy switching method includes the steps of: detecting reception information on whether or not reception of the input data and the control data in the loop networks is performed normally; selecting the first loop interface unit and the second loop interface unit that are able to perform reception, based on this reception information; judging connection statuses of the loop networks, based on this reception information; and judging whether or not to switch the control rights between the pair of controllers, based on a result of the loop network judgment step. Accordingly, it becomes possible to provide the redundancy switching method of the redundant supervisory control system functioning as follows. In a case where, in the loop network judging step, it is judged that portions respectively in the plurality of loop networks do not overlap with one another, each of the portion starring from each of the pair of controllers, and ending at a location of a failure, the control can be continued without switching the control right over the loop networks. In addition, as a result of occurrence of failures in plural locations in the loop networks, there are cases: where it is judged that portions in the respective loop networks overlap with one another, each of the portions starting from each of the pair of controllers, and ending at a location of the failure; and where, due to segmentation of the loop networks respectively of the plurality of controllers, the loop networks are different from one another in a range where each of the controllers can access the plurality of the remote input/output units. Even in these cases, switching of the control right can be avoided as much as possible based on information in the preset priority judgment table.

BRIEF DESCRIPTION OF THE DRAWINGS

FIG. 10 is a table explaining selection operations of loop interface units of a first switching controller and a second switching controller of the present invention.

FIG. 13 is a diagram for explaining an operation of the dual supervisory control system when failures occur in plural locations of the loop networks.

FIGS. 14A and 14B are tables for explaining an operation of the dual supervisory control system when failures occur in plural locations of the loop networks.

FIG. 16 is an example of a priority judgment table.

DETAILED DESCRIPTION OF THE EMBODIMENTS

Figure 1:
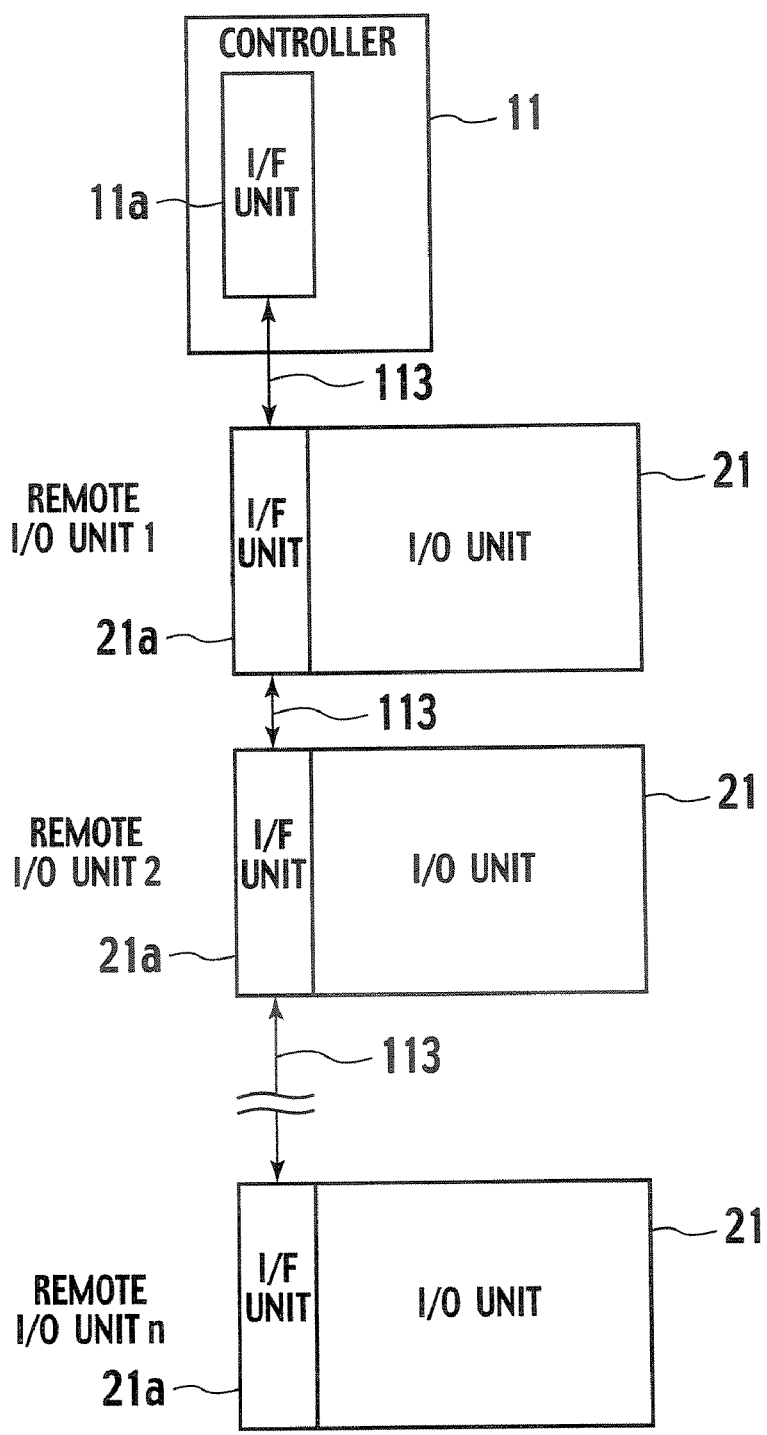
FIG. 1 is a block diagram of a conventional supervisory control system using a field bus.
Figure 2:
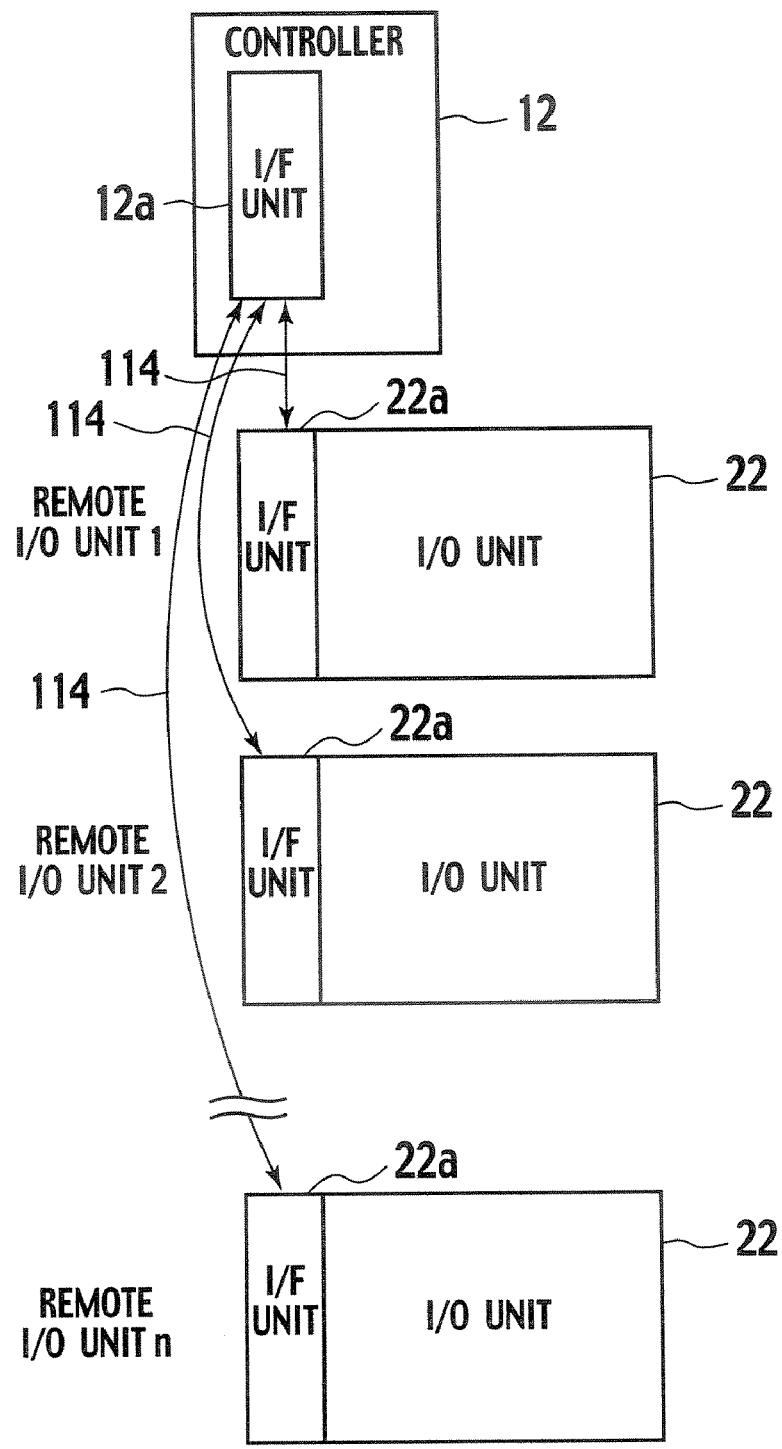
FIG. 2 is a block diagram of a conventional supervisory control system using parallel connections.
Figure 3:
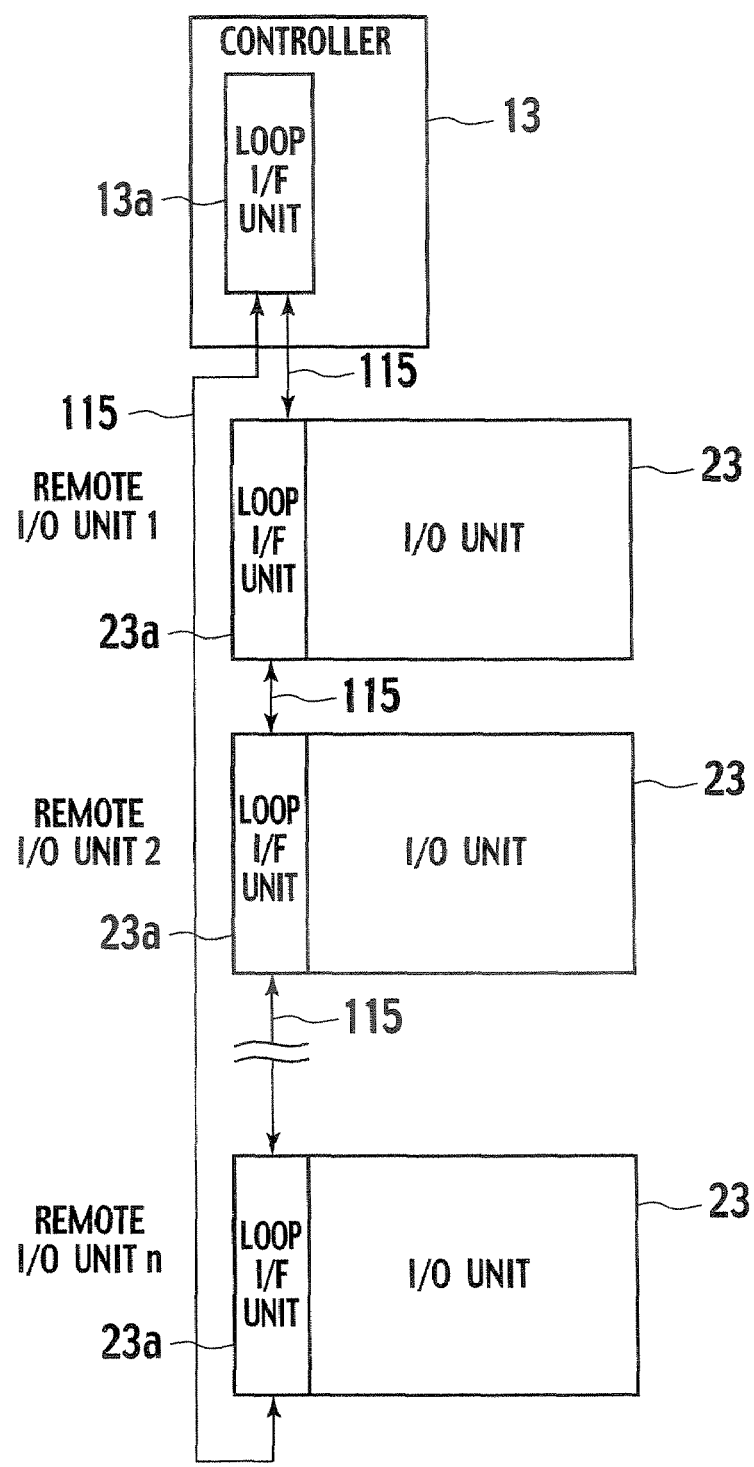
FIG. 3 is a block diagram of a conventional supervisory control system using ring connections.
Figure 4:
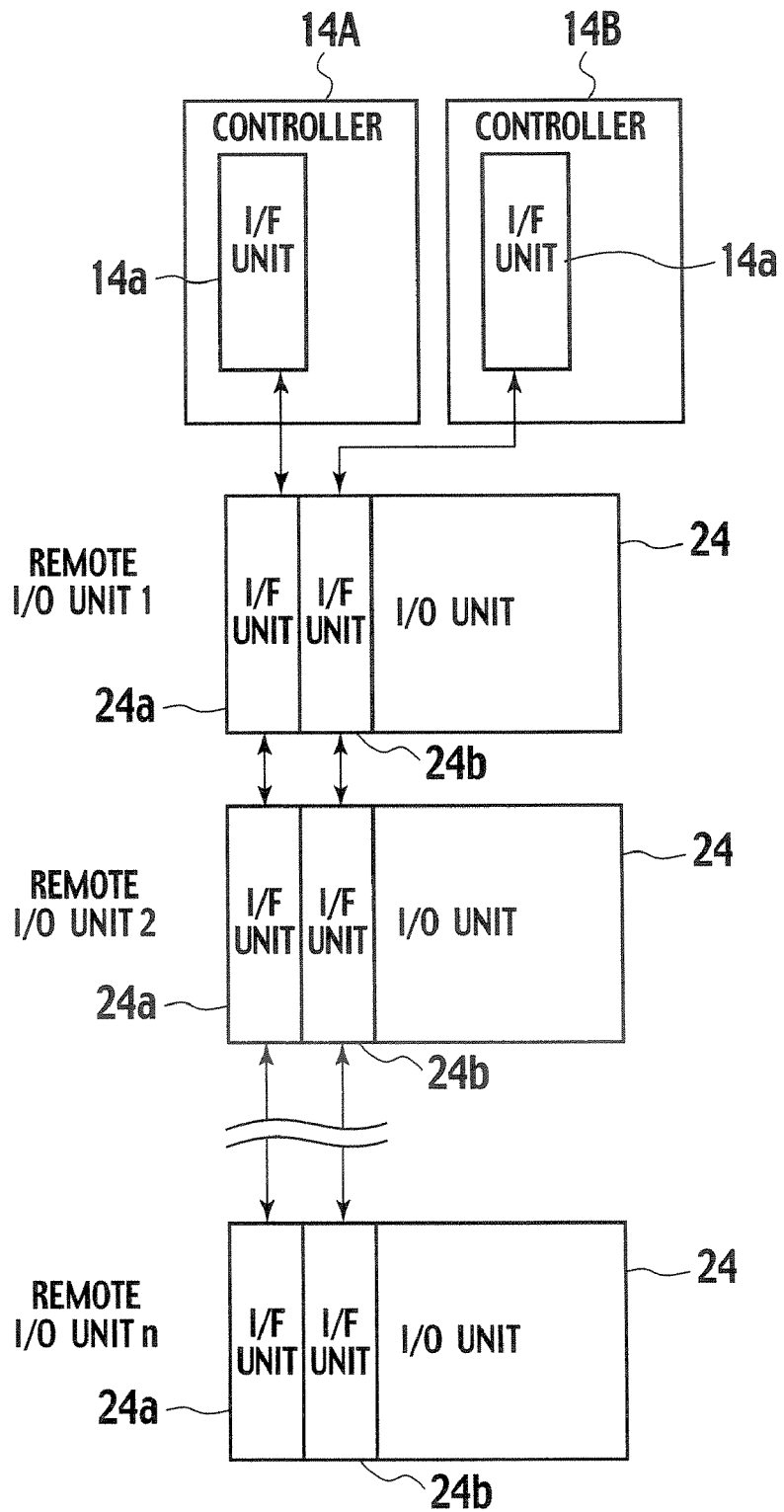
FIG. 4 is a block diagram of a conventional dual supervisory control system.
Figure 5:
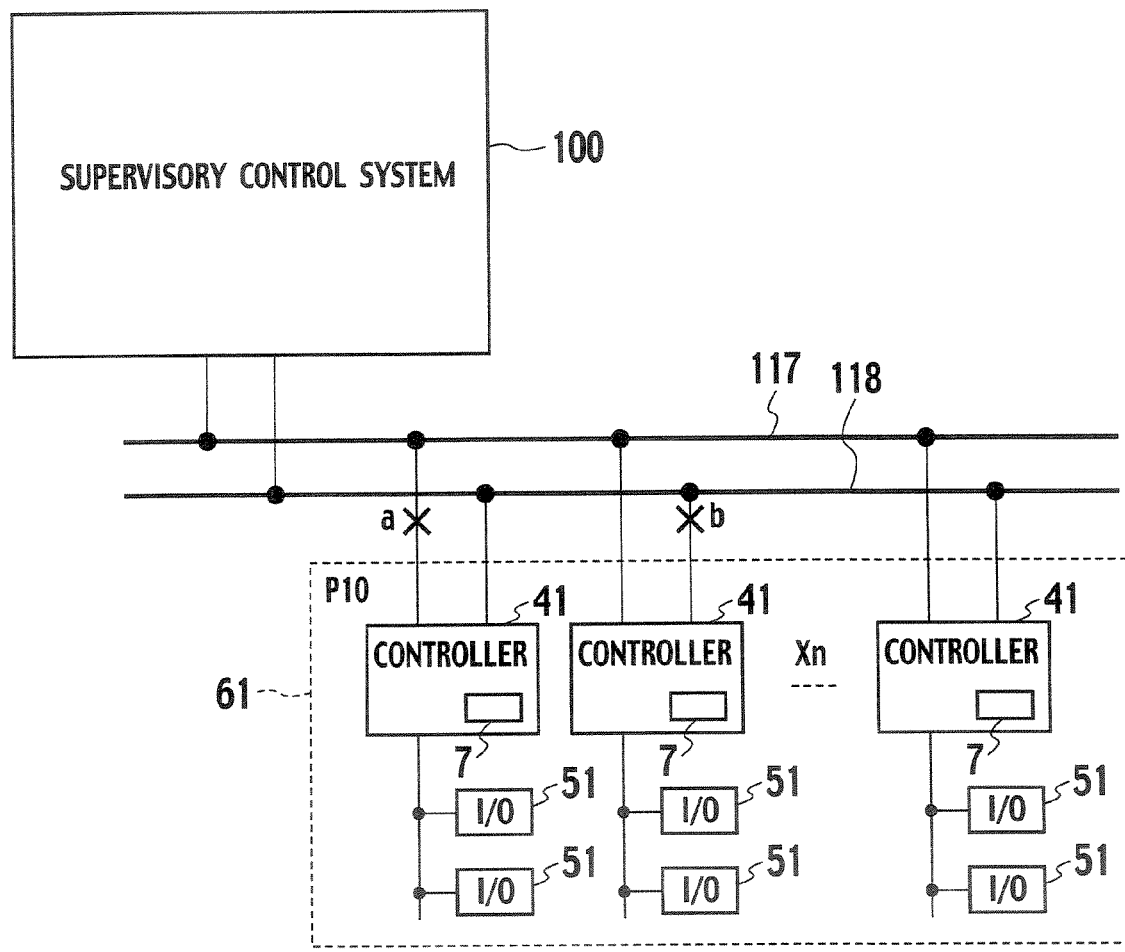
FIG. 5 is a block diagram of the other conventional dual supervisory control system.

An Example of an embodiment of the present invention will be described below by referring to the drawings.

Figure 6:
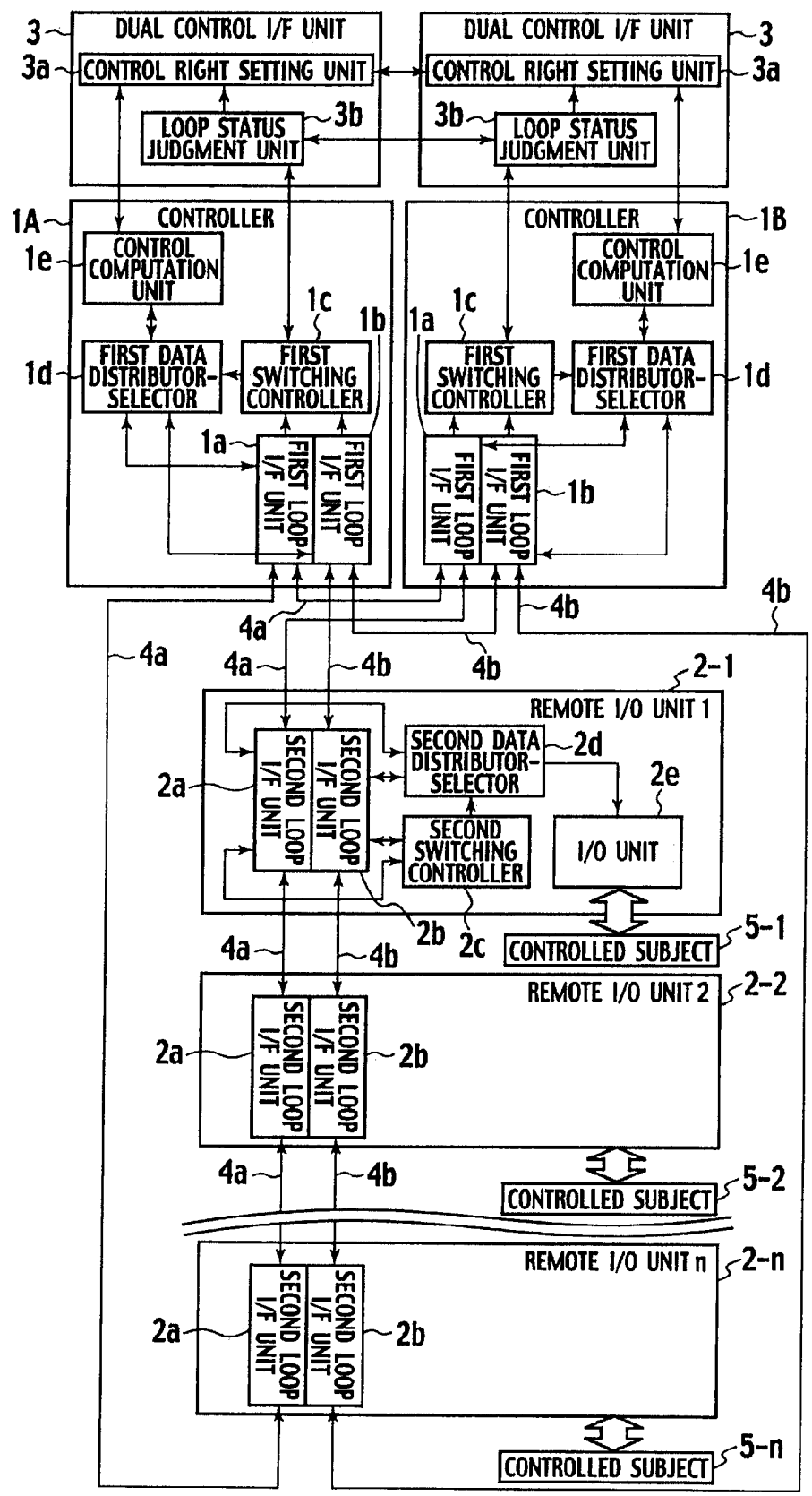
FIG. 6 is a block diagram of a dual supervisory control system of the present invention.

A dual supervisory control system as a redundant supervisory control system according to the present invention will be described below by referring to FIGS. 6 to 12. FIG. 6 is a block diagram of a dual supervisory control system used in, for example, a petroleum plant, a chemical plant or the like.

This dual supervisory control system includes a pair of controllers 1A and 1B (hereinafter, referred to as controllers 1 when collectively referring to the controllers), a plurality of remote input/output (I/O) units 2-1 to 2-n (hereinafter, referred to as remote I/O units 2 when collectively referring to the remote I/O units), a transmission path 4a and a transmission path 4b. The remote I/O units 2 collect measurement signals outputted from controlled subjects 5-1 to 5-n (hereinafter, referred to as controlled subjects 5 when collectively referring to the controlled subjects) controlled by the controllers 1, input measurement signals in the controllers 1, and output control outputs to the controlled subjects 5. Each of the transmission path 4a and the transmission path 4b is composed of communication cables connecting the controllers 1 and the remote I/O units 2 to one another.

Furthermore, each of the pair of controllers 1 includes a dual control interface (I/F) unit 3 which previously sets each of the controllers 1 to have a control right as an active system or a standby system.

The controllers 1, the remote I/O units 2, and the transmission paths 4a and 4b are connected by making field buses (of the IEC611158 standard) dual-redundant in a ring shape, the field buses being one form of digital networks used in communications between measurement-and-control instruments. (Hereinafter, each network connected in the ring shape will be referred to as a loop network.)

A communication access of this field bus may be any one of a master-slave method, a token passing method, and a CSMA/CD (carrier sense multiple access with collision detection) method in this ring topology. The loop network is set to allow communications in two directions.

Additionally, apart from actual input data or control data, an identifier is attached to data transmitted over the loop network. With the identifier, a transmission source and a destination address can be identified.

Figure 7:
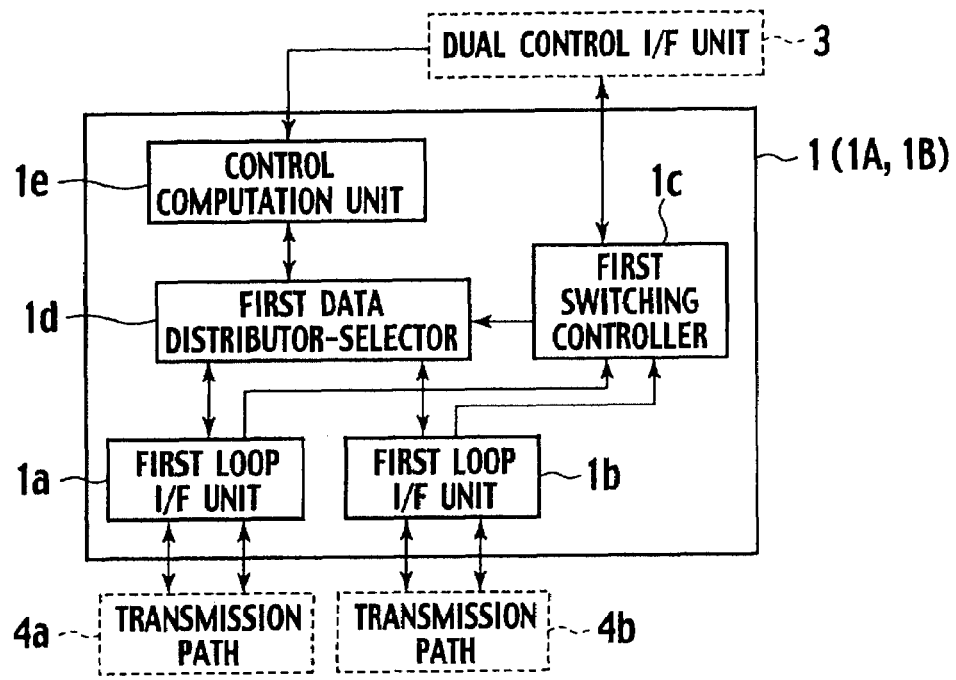
FIG. 7 is a block diagram of a controller of the present invention.

Next, a composition of each unit will be described. As shown in FIG. 7, each of the pair of controllers 1 is composed of a pair of first loop interface (I/F) unit 1a and first loop interface (I/F) unit 1b (hereinafter, referred to as a first loop I/F unit in the drawings), a first switching controller 1c, and a first data distributor-selector 1d. The first loop I/F units 1a and 1b are connected respectively to the transmission path 4a and to the transmission path 4b. The first switching controller 1c is connected to the first loop I/F units 1a and 1b, and generates a selection signal of selecting any one of the pair of first loop I/F units 1a and 1b depending on reception information representing whether or not data received respectively by the first loop I/F units 1a and 1b are received normally. The first data distributor-selector 1d is connected to the first switching controller 1c, captures input data outputted from the first loop I/F unit 1a selected by the first switching controller 1c, and outputs control data to the first loop I/F units 1a and 1b.

Each of the pair of controllers 1 is also composed of a control computation unit 1e connected to control right setting unit 3a described later. The control computation unit 1e sets the control right determined by the control right setting unit 3a, and outputs the control data to the first data distributor-selector 1d, the control data figured out based on the input data from the first data distributor-selector 1d.

In detail, the first data distributor-selector 1d outputs the same control data to the first loop I/F units 1a and 1b respectively of two systems, the control data outputted from the control computation unit 1e. Additionally, with respect to input data from the first loop I/F units 1a and 1b respectively of the two systems, the first data distributor-selector 1d selects one of the input data of the two systems, the one being selected by the first switching controller 1c, and transmits the selected one to the control computation unit 1e.

Additionally, the first switching controller 1c is connected to the first loop I/F units 1a and 1b, and judges reception statuses in the loop networks, and transmits the reception statuses to loop status judgment unit 3b of the dual control I/F unit 3.

Figure 8:
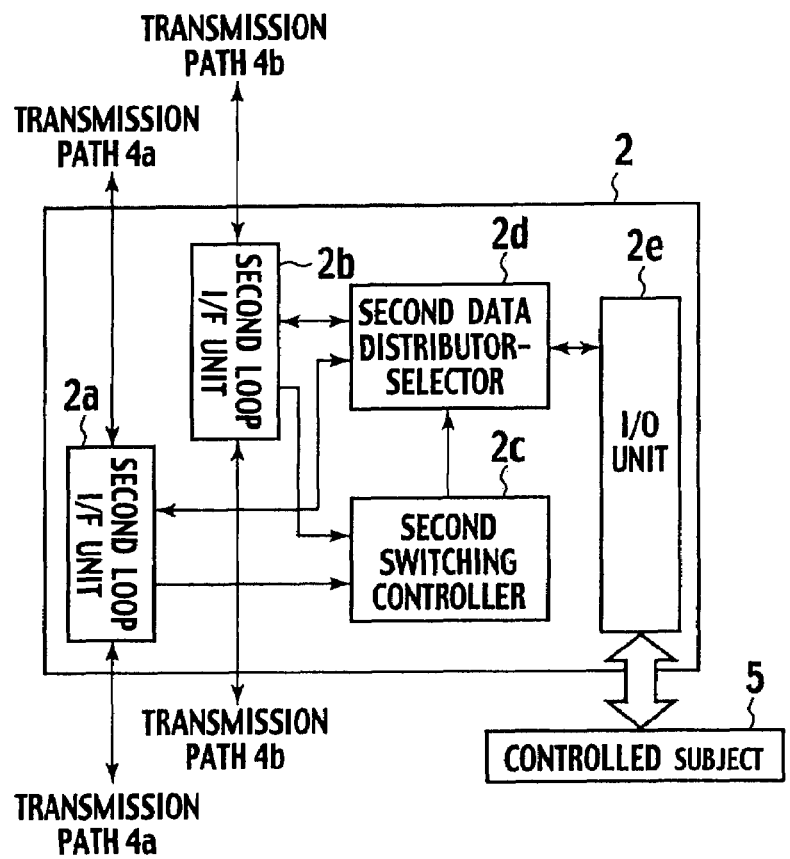
FIG. 8 is a block diagram of a remote input/output (I/O) unit of the present invention.

Next, a composition of the remote I/O unit 2 will be described by referring to FIG. 8. The remote I/O unit 2 is composed of a second loop I/F unit 2a, a second loop I/F unit 2b, and a second switching controller 2c. The second loop I/F units 2a and 2b are respectively connected to the transmission path 4a and the transmission path 4b of the respective two systems in such a manner that the second loop I/F units 2a and 2b can communicate with the respective transmission paths 4a and 4b in two directions. The second switching controller 2c is connected to the second loop I/F units 2a and 2b. The second switching controller 2c generates a selection signal of selecting any one of the second loop I/F units 2a and 2b depending on reception information representing whether or not data received by the second loop I/F units 2a and 2b through the respective transmission paths 4a and 4b are received normally.

The remote I/O unit 2 is also composed of a second data distributor-selector 2d and an I/O unit 2e. The second data distributor-selector 2d is connected to the second switching controller 2c. Moreover, one end of the second data distributor-selector 2d is connected to the second loop I/F units 2a and 2b, and the other end thereof is connected to the I/O unit 2e. The I/O unit 2e is connected to the controlled subject 5, transmits the input data detected by the controlled subject 5 to the second data distributor-selector 2d, and outputs, to the controlled subject 5, the control data outputted from the second data distributor-selector 2d.

In detail, the second data distributor-selector 2d transmits, to the I/O unit 2e, control data outputted from one of the second loop I/F units 2a and 2b, the one being selected by the selection signal of the second switching controller 2c. Additionally, the second data distributor-selector 2d transmits the input data collected by the I/O unit 2e to the second loop I/F units 2a and 2b of the respective two systems.

Next, a composition of the dual control I/F unit 3 will be described by referring to FIG. 6 again. Each of the dual control I/F unit 3 is composed of the control right setting unit 3a and the loop status judgment unit 3b. The control right setting unit 3a connects a pair of the dual control I/F units 3 to each other, and mutually receives a signal on presence/absence of a failure in the pair of controllers 1. The presence/absence of a failure is found by a self-diagnosis of the pair of controllers 1. In addition, the pair of control right setting unit 3a switch the control rights of the controllers 1 to each other. The pair of loop status judgment unit 3b inspect the reception statuses of the controllers 1 and the remote I/O units 2 by using a predetermined diagnosis method that has been previously set, receive the reception information on whether or not the reception statuses are normal via the first switching controller 1c, and thus judge the reception statuses in the loop networks.

When the controller 1B is set in a standby state, although the controller 1B collects the input data and executes control computation, the controller 1B does not output the control data to the remote I/O units 2. However, the pair of the loop status judgment unit 3b are set to periodically communicate with each other, and to monitor whether the remote I/O units 2 respectively of their own loop networks are operating normally.

Figure 9:
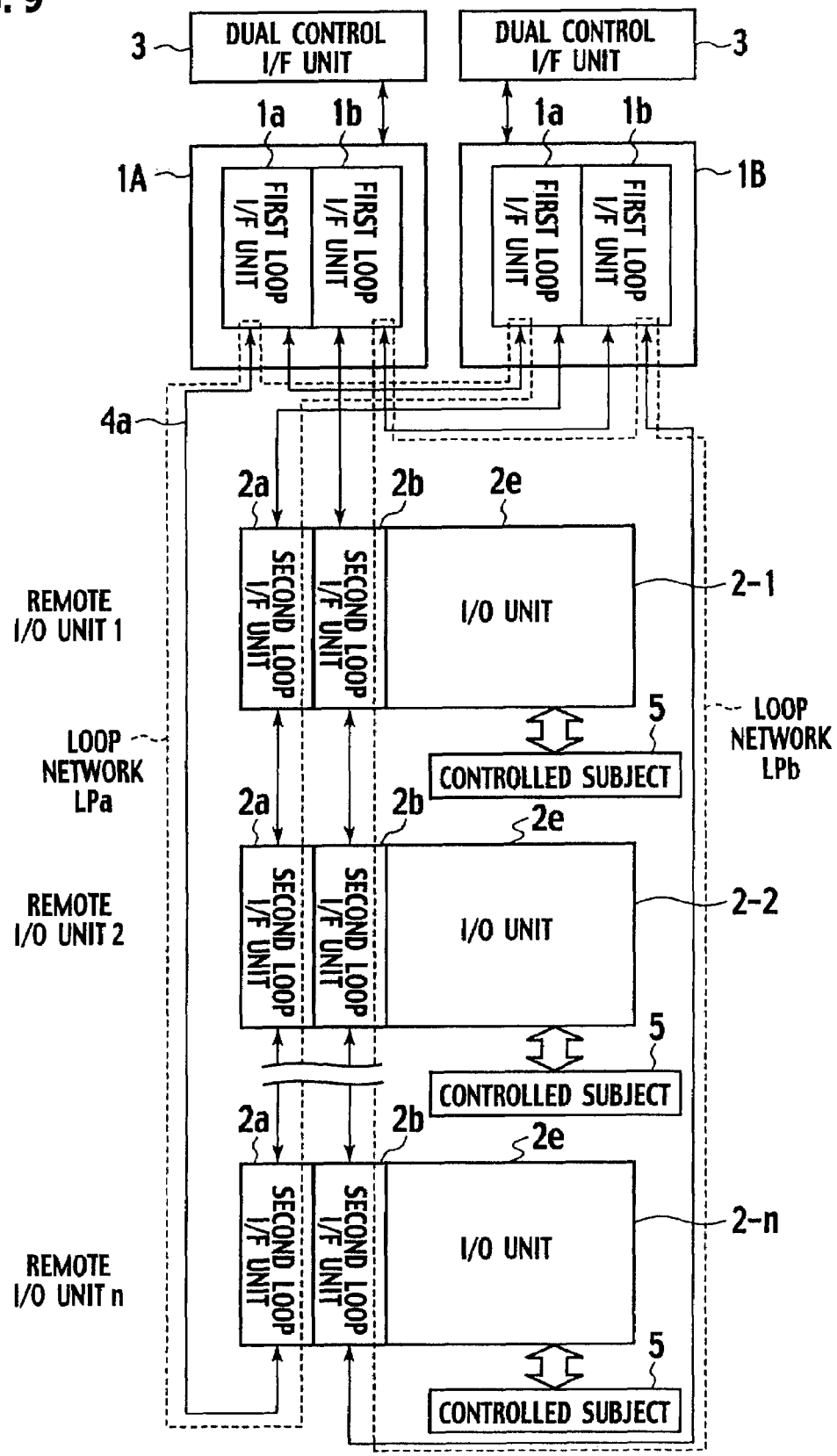
FIG. 9 is a diagram explaining loop networks of the dual supervisory control system of the present invention.

Here, the loop networks will be described by referring to FIG. 9. As network groups, there are two lines of a loop network LPa connected through the transmission path 4a, and a loop network LPb connected through the transmission path 4b, as shown by broken lines in FIG. 9.

For example, the loop network LPa is constituted by connecting the first loop I/F unit 1a of the controller 1A in an active state, the first loop I/F unit 1a of the controller 1B in a standby state, and the second loop I/F units 2a of the respective remote I/O units 2-1 to 2-n to one another in a circular loop (also referred to as a loop, or a ring).

Likewise, the loop network LPb is constituted by connecting the first loop I/F unit 1b of the controller 1A in the active state, the first loop I/F unit 1b of the controller 1B in the standby state, and the second loop I/F units 2b of the respective remote I/O units 2-1 to 2-n to one another in a circular loop.

It is not necessary that the controllers 1A and 1B be arranged next to each other on the respective loop networks LPa and LPb. Thus, the controllers 1A and 1B may be arranged in any arbitrary positions on the loop networks.

Next, a configuration of a communication protocol of these loop networks will be described. With the constitutions of the loop networks LPa and LPb, received data are likely to circulate continuously around the loop networks LPa and LPb. This circulation can be avoided in the following manner. The controller 1A having the control right functions as a master node, and blocks any one of the transmission paths 4a and 4b. Alternatively, the controller 1A blocks any place in one of the network loops LPa and LPb.

Additionally, the transmitting side may output data in two directions of the loop circulation, and the receiving side may select one of the data transmitted in the two directions. Alternatively, the transmitting side may output data in any one of the two directions, and may output in the direction opposite to the foregoing one in the event of abnormality.

Concerning restoration from a failure as well as avoidance of infinite circulation in the loop networks LPa and LPb, a spanning tree protocol can be used for this purpose.

Additionally, in the field bus, a transmission band is shared by all of the remote I/O units. Thereby, there is a possibility that contention may occur. However, resources in the network are required to be fairly allocated by enlarging transfer capacities of the bus, or by adjusting timings of data transfers by means of the controller 1A functioning as a master node.

Otherwise, the contention may be avoided by using the CSMA/CD method or the token passing (token circulation) method as another method.

Subsequently, by referring to FIG. 10, descriptions will be given of selecting operations of the first switching controller 1c and the second switching controller 2c for the purpose of selecting any one of the network loops LPa and LPb.

In FIG. 10, a table shows the controller 1 and the remote I/O units 2 in the leftmost first column, reception statuses respectively of the loop I/F units currently selected in the second column, reception statuses respectively of the other loop I/F units currently unselected in the third column, and selection judgment operations by the first switching controller 1c and the second switching controller 2c in the rightmost fourth column. The selection judgment operation represents how to select one of the loop I/F units corresponding to each combination of the normal/abnormal reception statuses of the respective loop I/F units.

For example as shown in the section regarding the controller 1, the first switching controller 1c maintains the selection statuses in the following three cases: where reception information of the first loop I/F unit 1a currently selected and of the other first loop I/F unit 1b currently unselected are both normal; where the reception information of the first loop I/F unit 1a currently selected and of the other first loop I/F unit 1b currently unselected are respectively normal and abnormal; and where the reception information of the first loop I/F unit 1a currently selected and of the other first loop I/F unit 1b currently unselected are both abnormal.

On the other hand, the first switching controller 1c outputs a selection signal for switching to the loop I/F unit 1b currently unselected in a case where the reception information of the first loop I/F unit 1a currently selected and of the other first loop I/F unit 1b currently unselected are respectively abnormal and normal.

Likewise, for example, the second switching controller 2c maintains the selection statuses in the following three cases: where reception information of the second loop I/F unit 2a currently selected and of the other second loop I/F unit 2b currently unselected are both normal; where reception information of the second loop I/F unit 2a currently selected and of the other second loop I/F unit 2b currently unselected are respectively normal and abnormal; and where reception information of the second loop I/F unit 2a currently selected and of the other loop I/F unit 2b currently unselected are both abnormal.

On the other hand, the second switching controller 2c outputs a selection signal for switching to the loop I/F unit 2b currently unselected, in a case where reception information of the second loop I/F unit 2a currently selected and of the other loop I/F unit 2b currently unselected are respectively abnormal and normal.

Figure 11:
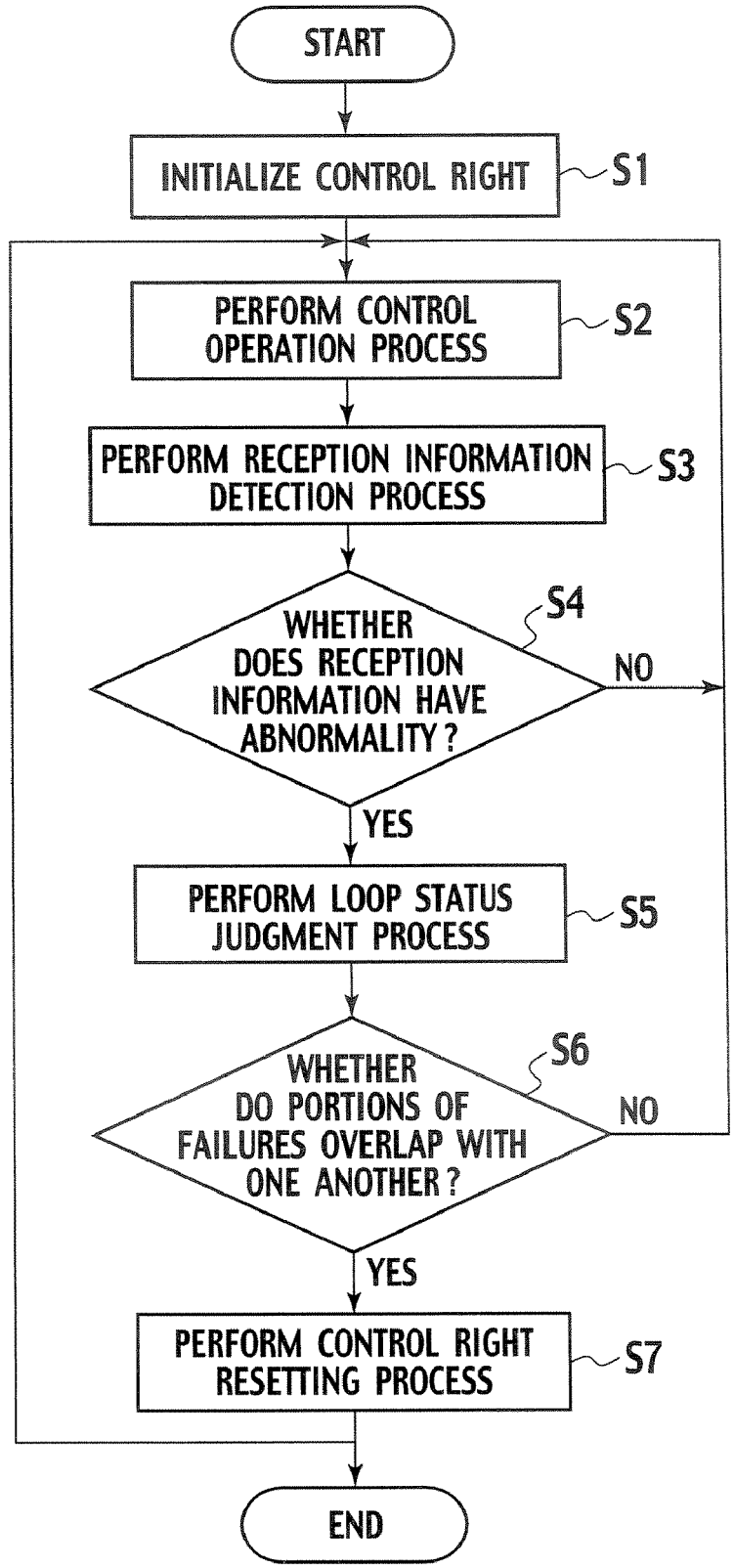
FIG. 11 is a flowchart of a control operation of the dual supervisory control system of the present invention.

An operation of the dual supervisory control system of this embodiment configured in the above described manners will be described by referring to FIGS. 6 and 11.

For example, first of all, initialization of the control right is performed on the controllers 1. In this initialization, the pair of control right setting unit 3a of the dual control I/F units 3 set one of the pair of controllers 1 as the active one, and the other controller 1 as the standby one. To be more precise, the pair of control right setting unit 3a set, as an active system, the controller 1A completing starting up earlier at power on, at startup and at reset, and set the other controller 1B as a standby system (S1).

Here, in a case where outputs from the loop status judgment unit 3b are normal, the loop network LPa is set to be selected.

In this condition, start of a control operation is commanded with an un-illustrated command button pushed from the controller 1A. Thus, a control operation process is started by the controller 1A of the active system. Details of this operation will be described later (S2).

Next, in a process of detecting reception information (S3), it is sequentially checked whether or not the reception information is normal at the first loop I/F unit 1a, the first loop I/F unit 1b, each of the second loop I/F units 2a and each of the second loop I/F units 2b through the loop networks (S4).

When an abnormality has been detected in the reception status, the reception information is transmitted to the loop status judgment unit 3b through the first switching controller 1c. When there is no abnormality, the control operation is continued as it is.

In this process of detecting reception information (S4), the judgment is made on the basis of, for example, whether or not the received data from each of the remote I/O units 2 connected to the two loop networks is normal. For instance, this judgment is made based on presence or absence of reception within a periodic time, or presence or absence of an error in the received data.

By this process of detecting abnormality, the judgment is made as to whether a break occurs in the transmission paths 4a and 4b, and whether a breakdown occurs in the first loop I/F units 1a, the first loop I/F units 1b, the second loop I/F units 2a, and the second loop I/F units 2b.

Then, the pair of loop status judgment unit 3b generate later described reception status tables of the respective loop networks, and judge locations of the failures and connection statuses (S5). The pair of loop status judgment unit 3b also judge whether or not portions respectively from the pair of controllers to the failure locations in the two network loops LPa and LPb overlap with each other (S6). Details of this judgment process will be described later.

Then, if the pair of loop status judgment unit 3b judge that the portions up to the failure locations overlap with each other, the pair of loop status judgment unit 3b further judge that there exists at least one of the remote I/O units 2 unable to perform communications. Subsequently, based on the preset priority judgment table of the remote I/O units 2, the judgment is made as to the necessity of switching the control rights (or the necessity of setting the control right again) (S7).

Next, details of each processing step in FIG. 11 will be described. First of all, a processing operation on input data and control data during the control operation process (S2) will be described.

In FIG. 6 again, for example, input data collected from the controlled subject 5 by the I/O unit 2e of the remote I/O unit 2-2 is outputted as the same information from the data distributor-selector 2d to the second loop I/F unit 2a and the second loop I/F unit 2b.

Then, the second loop I/F units 2a and the second loop I/F units 2b transmit the same information respectively to the two-way transmission paths 4a and 4b.

The remote I/O unit 2-1 and the remote I/O unit 2-3, which are adjacent to the remote I/O unit 2-2 respectively at both side thereof, transmit the received data to the transmission paths 4a and 4b in the directions opposite to the directions in which the data is received. Subsequently, likewise, the remote I/O unit 2-n transmits the data in the similar manner.

Then, the data is transmitted to the controller 1B of the standby system in the similar manner. In this manner, the input data collected by the I/O unit 2e of the remote I/O unit 2-2 is transmitted to the controller 1A.

The rest of the remote I/O units 2-1 to 2-n operate in the similar manner, and transmit the respective input data to the controllers 1.

In the controllers 1, the control computation unit 1e performs an arithmetical process on each of the input data collected from the remote I/O units. In order to transmit, as control data, the result of the arithmetical process to each of the remote I/O units, the data distributor-selector 1d outputs the same control data to the first loop I/F unit 1a and the first loop I/F unit 1b.

Then, the first loop I/F unit 1a and the first loop I/F unit 1b outputs the same control data to the two-way transmission paths 4a and 4b.

The second loop I/F unit 2a and the second loop I/F unit 2b of each of the remote I/O units 2 transmit this control data to the transmission paths 4a and 4b in the directions opposite to the directions in which the control data is received. At the same time, when the remote I/O unit 2 receives self-addressed data, the second loop I/F units 2a and 2b transmit reception information to the second switching controller 2c. Then, the received data is transmitted from the selected second loop I/F unit to the I/O units 2e through the data distributor-selector 2d.

In this manner, the supervisory control on the controlled subjects 5 is executed by the controller 1A, which is currently active.

Next, referring to FIGS. 12 to 15, descriptions will be given of details of the process of judging loop statuses (S5 to S6) and the process of setting the control right again (S7) in a case where a break of the communication cables for the transmission paths 4a and 4b, and a breakdown of the remote I/O units 2 occur in any locations in these loop networks.

Figure 12:
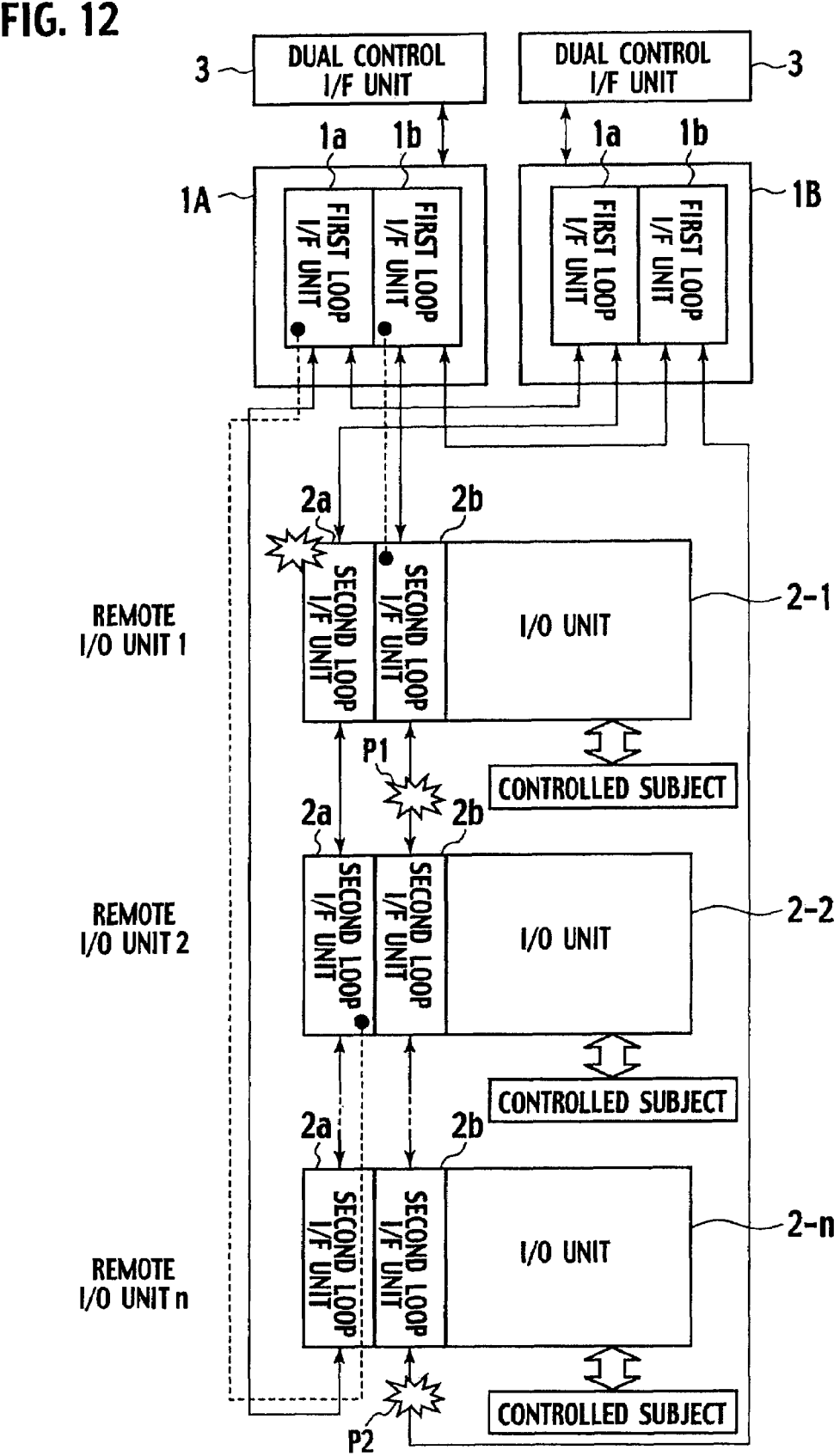
FIG. 12 is a diagram for explaining an operation of the dual supervisory control system when failures occur in plural locations of the loop networks.

FIG. 12 shows a case where the second loop I/F unit 2a of the remote I/O unit 2-1 has a breakdown in the loop network LPa, and where two breaks of locations P1 and P2 of the transmission path 4b occur in the loop network LPb.

In this case, the remote I/O units 2-2 to 2-n are accessible through a route indicated by the broken line. At the same time, the remote I/O unit 2-1 is accessible through the second loop I/F unit 2b to which a switching is made from the loop I/F unit 2a having the breakdown.

In the event of breaks of the communication cable of the transmission paths 4a and 4b, and a breakdown in one location in the second loop I/F unit 2a or 2b of the remote I/O unit 2 as in the above case, all of the remote I/O units 2 are accessible from the controller 1A. Thus, the control can be executed without switching the control right of the controller 1A.

That is, in the case where plural breaks of the communication cable occur in plural locations in a single loop network, and where plural breakdowns occur in the second loop I/F units 2a and 2b respectively of plural remote I/O units 2, the remote I/O units 2 located at sides far from locations of the failures from the controller 1A become inaccessible. Nevertheless, in a case where portions between the failures respectively in the loop networks LPa and LPb do not overlap with each other, all of the remote I/O units 2 are accessible from the controller 1A. This makes it possible to continuously execute the control without switching the control right of the controller 1A.

However, in cases where both of the loop networks LPa and LPb have abnormalities, various failure patterns occur. The process of setting the control right by the dual control I/F unit 3 in these cases will be described by referring to FIG. 13 and FIGS. 14A to 14B.

FIG. 13 shows a state where four breaks occur in two locations P1 and P2 in the loop network LPa of the dual supervisory control system, and also, in two locations P3 and P4 in the loop network LPb thereof.

FIG. 14A is an example of a loop status judgment table produced by the loop status judgment unit 3b. The loop status judgment unit 3b produces the table by receiving the reception information having been received by the first switching controller 1c of the controller 1A. Likewise, FIG. 14B is an example of a loop status judgment table produced by the loop status judgment unit 3b. The loop status judgment unit 3b produces the table by receiving the reception information having been received by the first switching controller 1c of the controller 1B.

The loop status judgment tables are produced in the following manner. For example, keep-alive messages are periodically transmitted from each of the remote I/O units 2. Then, if each of the first switching controllers 1c receives no keep-alive message for a certain period of time or longer, this is judged as abnormality.

Besides, the loop status judgment tables may be produced sequentially during the control operation by using transmitted data which are the actual input data and control data.

For example, here, suppose a case where the remote I/O unit 2-2 is a transmission source of a transmission signal. In the loop network LPa, the failure occurs in a portion interposed between the points P1 and P2. For this reason, the controller 1A cannot receive both of the transmission signals from the remote I/O unit 2-2 in the clockwise direction F and in the counterclockwise direction R within the predetermined period of time in the loop network LPa (indicated by "U" in the table). However, in the loop network LPb, the controller 1A can normally receive both of the transmission signals in both of the directions (indicated by "S" in the table).

By tabulating the normal/abnormal status shown in this reception information of each transmission source node also in association with the transmission directions, a location of a failure is determined. For example, the reception statuses of the remote I/O units 2-1 and 2-2 are respectively normal and abnormal. In addition, the reception status of the I/O unit 2-n is normal. Accordingly, the loop status judgment unit 3b judges, as an inaccessible abnormal portion, a portion of this loop network LPa, the portion starting from the remote I/O unit 2-1, and ending at the remote I/O unit 2-(n-1) through the remote I/O unit 2-2, in the counterclockwise direction. As a result, it is possible to estimate that there are breaks in the two locations P1 and P2.

Additionally, the judgment is made as to the necessity of switching the control rights, for example, by referring to a priority judgment table beforehand set for each of the remote I/O units 2, the priority judgment table being previously stored in the control right setting unit 3a. In other words, the control right is switched to the controller 1 with which the remote I/O unit 2 listed in priority this table can communicate.

For example, in a case where the remote I/O unit 2-2 is listed in the priority judgment table, switching of the control rights are not performed. This is because the remote I/O unit 2-2 can communicate with the controller 1A as shown in FIG. 14A.

However, in a case where the remote I/O unit 2-3 is listed in advance in the priority judgment table, the controller 1A notifies the controller 1B of switching of the control rights via the pair of control right setting unit 3a. In stead of this priority judgment table, a condition for judging whether or not to switch the control rights may be provided. An example of the condition is a judgment logic which judges to switch the control right in a case where the number of the remote I/O units 2 which can communicate with a controller 1 in a standby state exceeds that of a controller 1 in an active state.

Thus, it becomes possible to realize the operation of the dual supervisory control system avoiding the switching of the control rights as much as possible, by judging a failure pattern in the manner mentioned above.

Even in the configuration as described above, there are some failure patterns that require the switching of the control rights. For example, in a case where the second loop I/F units 2a and 2b of the same remote I/O unit 2 concurrently have breakdowns, this remote I/O unit 2 becomes inaccessible.

Figure 15:
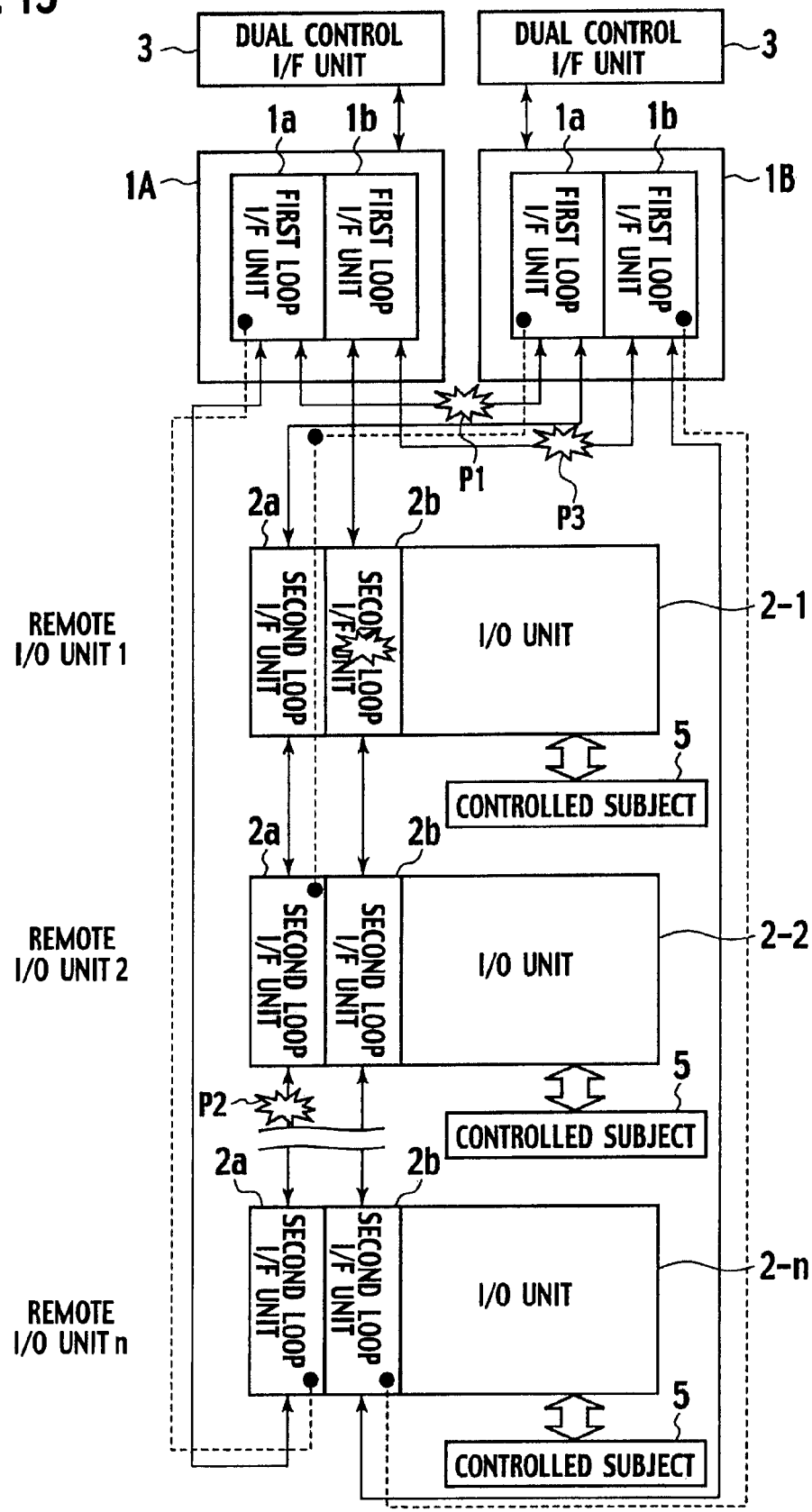
FIG. 15 is a diagram for explaining a control operation when inaccessible locations occur in the loop networks.

Additionally, as shown in FIG. 15, in some case, there may be occurrence of a failure pattern in which ranges accessible respectively from the controllers 1A and 1B are different. For example, as shown in FIG. 15, the controller 1A can access only the remote I/O unit 2n, the controller 1B can access all of the remote I/O units 2.

In the case of this failure pattern, the controller 1B which can access all of the remote I/O units 2 is switched from a standby state to an active state.

The control right setting unit 3a of the dual control I/F unit 3 of the active system inquires of the control right setting unit 3a of the controller 1B of the counterpart system (standby system) about the current status thereof. Then, if the controller 1B itself has a breakdown, the control right setting unit 3a judges that the standby system has a failure. Consequently, the controller 1A operates singly as the active system.

By making a judgment on switching of the control rights with this configuration, a conventional dual supervisory control system performs switching from an active system to a standby system in the event of a failure in the controller of the active system. In this case, data obtained by arithmetically processing input data collected by the active system is constantly transmitted from the active system to the standby system via the dual control I/F units in order to maintain continuity of control.

On the other hand, according to the present invention, the active and standby systems can constantly share the information of the same input data without taking the trouble of giving and receiving the data via the dual control I/F units. This brings about an effect of avoiding transmission of an enormous amount of data in the dual I/F units. Furthermore, this brings about an effect of enabling a high-speed switching operation because delays caused when the data is transmitted via the dual I/F units are eliminated.

The present invention is not at all limited to the above described embodiment. The loop networks and the transmission paths thereof may be composed of radio communication paths. Additionally, although the loop networks with a dual-redundant configuration have been described in the present description, loop networks with a triple-redundant or quadruple-redundant configuration may be adopted.

Furthermore, the reliability of transmitted data may be enhanced in the following way. The second data distributor-selector $2d$, which transmits input data, gives the sequence number to the input data to be transmitted. Thereafter, a judgment is made as to whether the reception information is normal in each of the first loop I/F unit $1a$ and the first loop I/F unit $1b$, which receive the input data. At this time, firstly, the received sequence numbers of the respective first loop I/F units are compared with each other. Then, if any one of the sequence numbers is not updated within a certain period of time, it is judged that the network loop of the first loop I/F unit having the un-updated sequence number is abnormal. In addition, in a case where both of the network loops are normal, the network loop of the first loop I/F unit having the latest sequence number is selected. Thus, the present invention can be implemented by adding various modifications within a scope not departing from the spirit of the present invention.

What is claimed is:

1. A redundant supervisory control system having a pair of network loops in parallel in a single loop network, comprising:
    a pair of controllers each collecting input data from a controlled subject, and outputting control data based on the input data;
    a plurality of remote input/output units each connected to both of the pair of network loops in the single loop network for collecting the input data from the controlled subject, transmitting the input data to both of the controllers, and outputting, to the controlled subject, the control data transmitted from an active one of the pair of controllers currently executing control;
    communication cables each connecting the pair of controllers and the plurality of remote input/output units to make the pair of network loops in parallel; and
    a pair of redundant control interface units for mutually monitoring abnormality statuses of the pair of controllers, and setting a control right allowing any one of the pair of controllers to execute control in an active state, and the other controller to be in a standby state, and
    the redundant supervisory control system being configured to control the controlled subject by performing communications in two directions of clockwise and counter-clockwise in each of the pair of network loops in the single loop network composed of the pair of controllers, the plurality of remote input/output units and the communication cables, in accordance with a predetermined communication protocol,
    wherein each of the pair of controllers includes:
        a pair of first loop interface units each communicate the input data and the control data in the two directions with the counterpart controller and the remote input/output units, and judge whether the input data is normally received;
        a first switching controller which selects, among the pair of first loop interface units, one of the first loop interface units which is capable of performing normal reception, based on results of the judgments of the respective first loop interface units;
        a first data distributor-selector which receives the input data outputted from one of the first loop interface units selected by the first switching controller, and distributes the control data among the pair of first loop interface units; and
        a control computation unit which receives the input data outputted from the first data distributor-selector, performs arithmetic processing on the input data, and outputs, as the control data, the result of the arithmetic processing to the first data distributor-selector, and
    wherein each of the plurality of remote input/output units includes:
        a pair of second loop interface units each communicate the input data and the control data in the two directions through each one of the pair of network loops with the pair of the controllers, and judge whether the control data is normally received;
        a second switching controller which selects, among the pair of second loop interface units, one of the second loop interface units which is capable of performing normal reception based on results of the judgments of the second loop interface units;
        a second data distributor-selector which outputs the control data outputted from one of the second loop interface units selected by the second switching controller, and distributes the input data collected from the controlled subject among the pair of second loop interface units; and
        an input/output unit which transmits the control data outputted from the second data distributor-selector to the controlled subject, and transmits the input data from the controlled subject to the second data distributor-selector, whereby
    when a reception failure is detected in at least one portion on one of the pair of network loops including one or both of the pair of first loop interface units and one or both of the pair of second loop interface units in one or plural remote I/O units, one or plural first loop I/F units capable of normally communicating and one of the pair of second loop I/F units in one or plural remote I/O unit, capable of normally communicating are automatically selected, so that transmissions are performed in one or both transmittable directions of each of the pair of network loops; and
    in a case where plural failure portions of the respective network loop do not overlap with each other, each of the portions starting from each of the pair of controllers, and ending at a location of a failure, the control is able to be continued without switching the control rights.

2. The redundant supervisory control system according to claim 1, wherein each of the redundant control interface units includes:
    loop status judgment means which judges connection statuses of the respective network loop by collecting reception information on whether communications between the controller and each of the plurality of remote input/output units are performed normally; and
    control right setting means which sets the control right in one of the pair of controllers based on both an output from the loop status judgment means and a priority judgment table beforehand set for each of the remote input/output units.

3. The redundant supervisory control system according to claim 2, wherein the pair of control right setting means of the respective redundant control interface units mutually monitor outputs respectively of self-diagnoses of abnormality statuses of the pair of controllers themselves, and reception status judgment tables generated respectively by the pair of the loop status judgment means, and thereby set the control right.

4. The redundant supervisory control system according to claim 2, wherein:
   each of the remote input/output units cyclically transmits any one of a message and data to the corresponding controller in the transmittable circulation directions; and
   each of the loop status judgment means receives response statuses, tabulates connection statuses in which communication can be made in each of the pair of network loops in the single loop network, and thereby judges a portion where the communication cannot be made.

5. The redundant supervisory control system according to claim 2, wherein:
   the pair of control right setting means cause a control operation to continue without switching the control rights, in a case where the pair of the loop status judgment means judge that portions respectively in the pair of network loops in the single loop network do not overlap with one another, each of the portions starting from each of the pair of controllers to a location of a failure; and,
   the pair of control right setting means set the control right again based on information in the preset priority judgment table, in a case where each of the pair of network loops in the single loop network is segmented, and where the pair of loop status judgment means judge that the communication statuses each of the pair of the network loops are different from one another in a range where each of the controllers can access the remote input/output units.

6. The redundant supervisory control system according to claim 1, wherein, the second switching controller generates a selection signal of selecting any one of the second loop interface units depending on reception information representing whether or not the input data is normally received by the second loop interface units.

7. A redundancy switching method for a redundant supervisory control system having a pair of network loops in parallel in a single loop network, the redundant supervisory control system including:
   a pair of controllers each collecting input data from a controlled subject, and outputting control data based on the input data;
   a plurality of remote input/output units each connected to both of the pair of network loops in the single loop network for collecting the input data from the controlled subject, transmitting the input data to both of the controllers, and outputting, to the controlled subject, the control data transmitted from an active one of the pair of controllers currently executing control;
   communication cables each connecting the pair of controllers and the plurality of remote input/output units to make the pair of network loops in parallel in the single loop network; and
   a pair of redundant control interface units for mutually monitoring abnormality statuses of the pair of controllers, and setting a control right allowing any one of the pair of controllers to execute control in an active state, and the other controller to be in a standby state, and
   the redundant control system being configured to control the controlled subject by performing communications in two directions of clockwise and counterclockwise in any one of the pair of network loops in the single loop network composed of the pair of controllers, the plurality of remote input/output units and the communication cables, in accordance with a predetermined communication protocol, wherein each of the pair of controllers includes:
   a pair of first loop interface units each communicate the input data and the control data in the two directions with the counterpart controller and the remote input/output units, and judges whether the input data is normally received;
   a first switching controller which selects, among the pair of first loop interface units, one of the first loop interface units which is capable of performing normal reception, based on results of the judgments of the respective first loop interface units;
   a first data distributor-selector which receives the input data outputted from one of the first loop interface units selected by the first switching controller, and distributes the control data among the pair of first loop interface units; and
   a control computation unit which receives the input data outputted from the first data distributor-selector, performs arithmetic processing on the input data, and outputs, as the control data, the result of the arithmetic processing to the first data distributor-selector, and wherein each of the plurality of remote input/output units includes:
   a pair of second loop interface units each communicate the input data and the control data in the two directions through each one of the pair of network loops with the pair of the controllers, and judges whether the control data is normally received;
   a second switching controller which selects, among the pair of second loop interface units, one of the second loop interface units which is capable of performing normal reception based on results of the judgments of the second loop interface units;
   a second data distributor-selector which outputs the control data outputted from one of the second loop interface units selected by the second switching controller, and distributes the input data collected form the controlled subject among the pair of second loop interface units; and
   an input/output unit which transmits the control data outputted from the second data distributor-selector to the controlled subject, and transmits the input data from the controlled subject to the second data distributor-selector, the redundancy switching method comprising:
detecting reception information on whether the input data and the control data are received normally at the receiver sides in each of the pair of network loops;
selecting one of the pair of first loop interface units for each of the pair of controllers and one of the pair of second loop interface units for each of the plurality of remote input/output units which are capable of performing reception, based on the reception information;
judging connection statuses of the pair of network loops based on the reception information; and
setting a control right each of the pair of controllers again, based on a result of the network loop judging step,
wherein the pair of redundant control interface units cause a control to continue without switching the control rights, in a case where the pair of redundant control interface units judge that portions respectively in the pair of network loops do not overlap with one another, each of the portions starting from each of the pair of controllers to a location of a failure; and the pair of redundant control interface units set the control right in one of the pair of controllers again, in a case where failures occur in a plurality of portions in each of the pair of network loops, and where the pair of redundant control interface units judge that the communication statuses of the respective network loop are different from one another in a range where each of the controllers can access the remote input/output units.

* * * * *